United States Patent

[11] 3,584,588

| [72] | Inventor | Lorenz W. Schultheiss |
| | | 415 E. 12th, Cozad, Nebr. 69130 |
| [21] | Appl. No. | 720,085 |
| [22] | Filed | Apr. 10, 1968 |
| [45] | Patented | June 15, 1971 |

[54] CORN LISTER SEED ORIENTER
7 Claims, 11 Drawing Figs.

| [52] | U.S. Cl. | 111/86 |
| [51] | Int. Cl. | A01c 5/06 |
| [50] | Field of Search | 111/83, 85, 86 |

[56] References Cited
UNITED STATES PATENTS

| 1,107,224 | 8/1914 | Perrine | 111/85 X |
| 1,416,331 | 5/1922 | Campbell | 111/86 |
| 2,416,189 | 2/1947 | McIntyre | 111/85 |
| 2,872,883 | 2/1959 | Padrick | 111/86 |
| 2,884,880 | 5/1959 | Miller | 111/85 |
| 2,885,978 | 5/1959 | Miller | 111/85 X |
| 3,195,485 | 7/1965 | Reynolds | 111/86 |
| 3,217,674 | 11/1965 | Williams | 111/86 |
| 3,303,801 | 2/1967 | Reynolds | 111/86 |

*Primary Examiner*—Robert E. Bagwill
*Assistant Examiner*—Alan E. Kopecki
*Attorneys*—Clarence A. O'Brien and Harvey B. Jacobson ABSTRACT: An upwardly opening groove forming runner unit and seed orienter for listers including a horizontally disposed wedge-shaped hollow body having forwardly and downwardly convergent upstanding opposite sidewalls inclined upwardly and outwardly approximately 10° relative to a vertical plane extending longitudinally of the body and approximately 5° to 7° rearwardly and outwardly relative to a center vertical plane. The lower marginal edge portions of the sidewalls include front and rear end portions and the front end portions are joined together and curve smoothly forwardly and upwardly toward a juncture established between the forward ends of the upper marginal edge portions of the sidewalls while the rear end portions of the lower marginal edge portions of the sidewalls are spaced above the lowermost extremities of the forward lower marginal edge portions and are spaced apart and generally parallel each other defining a seed discharge throat therebetween.

PATENTED JUN 15 1971 3,584,588
SHEET 1 OF 2
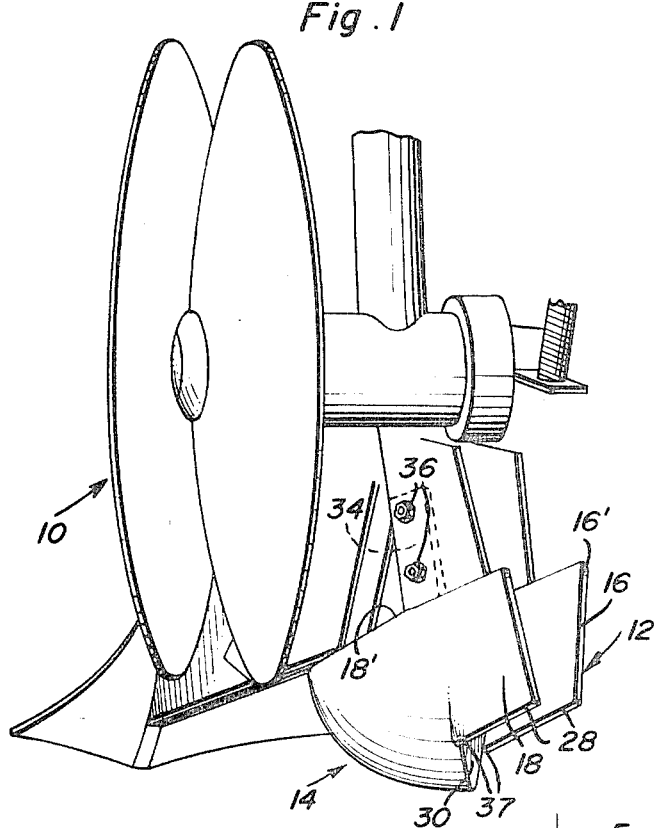
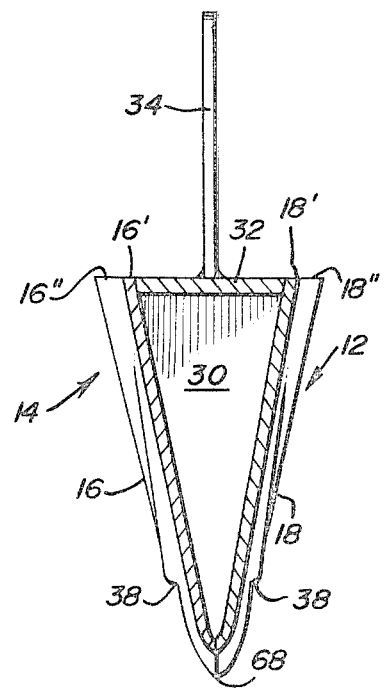
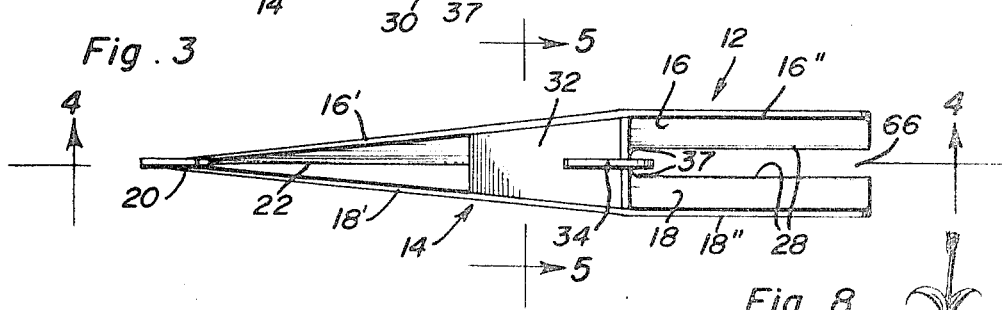
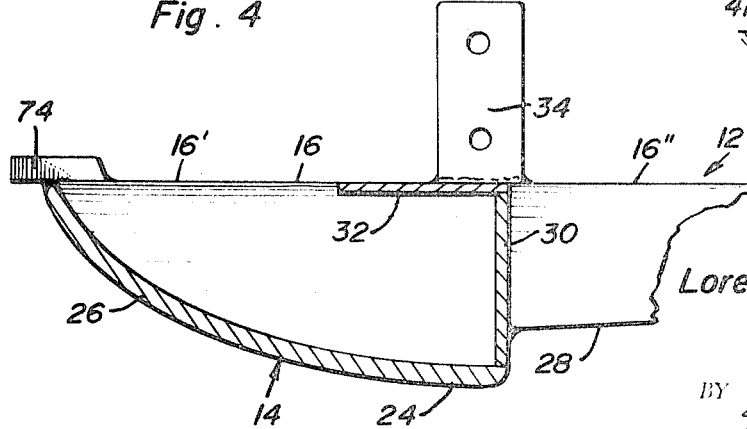
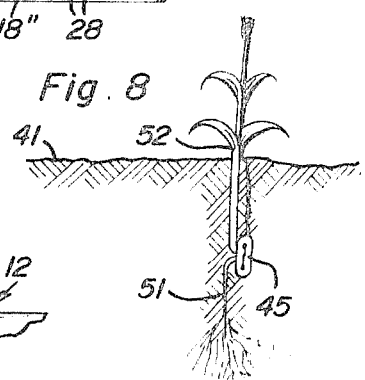
Lorenz W. Schultheiss
INVENTOR.

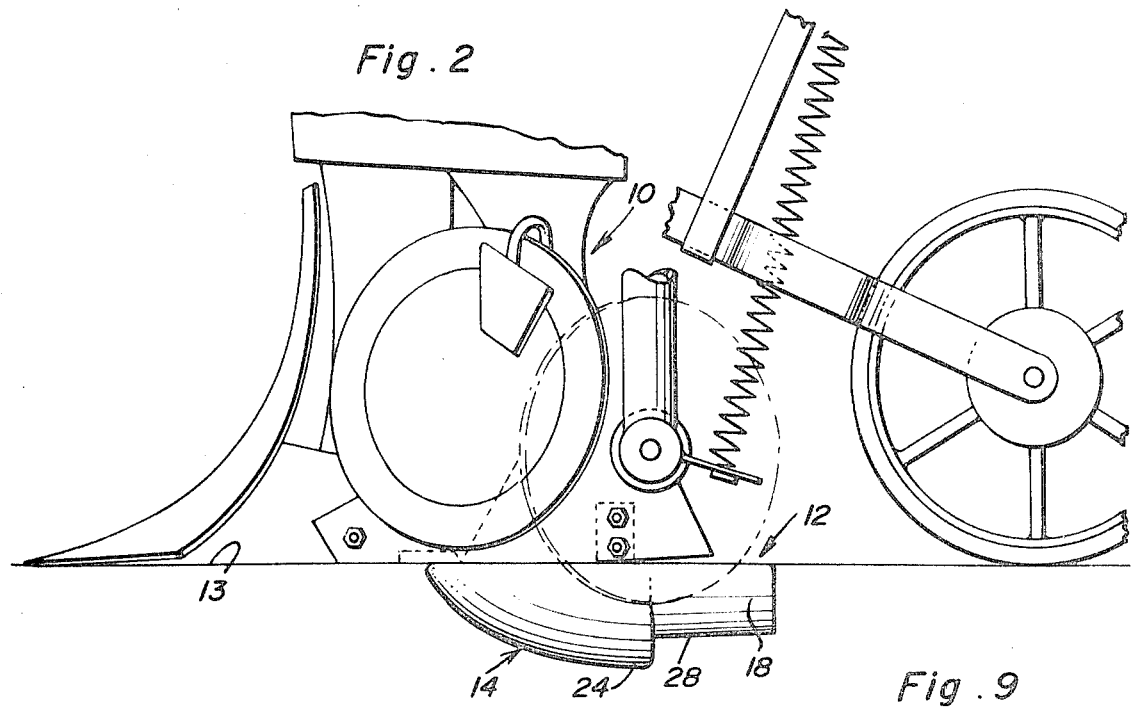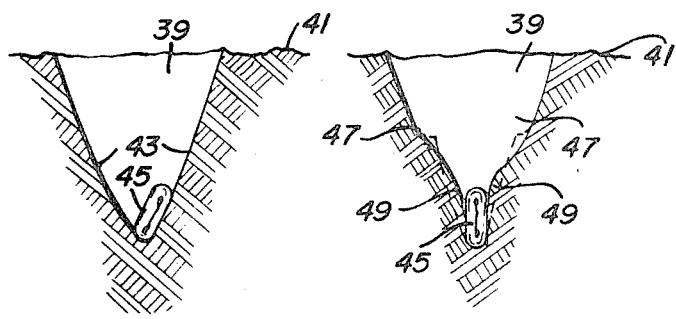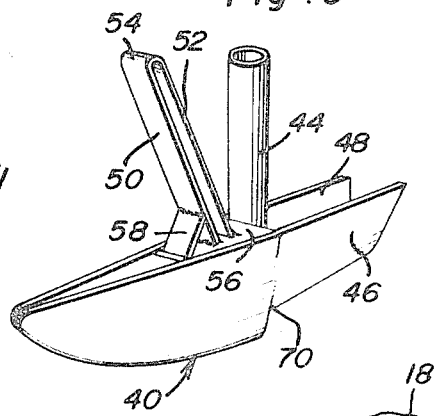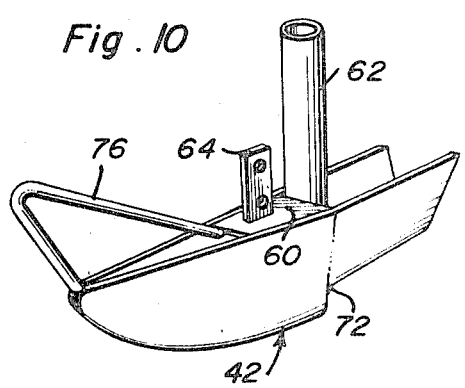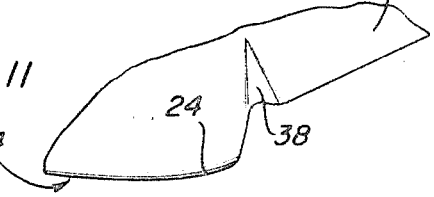
Lorenz W. Schultheiss
INVENTOR

CORN LISTER SEED ORIENTER

The groove forming runner unit and seed orienter of the instant invention has been specifically designed to provide a means whereby seed passing through the discharge throat of the unit will fall to the V-shaped bottom of a narrow groove formed in the ground by the unit and come to rest in the bottom of the groove with the greater dimension of the seed extending longitudinally of the groove. Also, the orienter includes means by which the lower portions of the sidewalls of the groove formed will be collapsed and tend to right seed corn on its edge and anchor the seed corn in the groove until it is closed by the associated lister. By providing an apparatus of this type substantially all planted seeds will be oriented in the same manner and at the same depth within the groove therefor formed in the ground. This will of course result in a uniform sprouting and growing of the seed resulting in uniform leafing out, uniform growth, uniform shade pattern and greatly increased crop production.

Although the runner unit of the instant invention is particularly well adapted to handle seed of corn, it functions in an advantageous manner when also used to plant bean seeds and any similar type of seed that can be planted with a lister.

The specific dimensions and inclinations relative to a vertical plane extending longitudinally of the unit set forth hereinafter have been found to particularly well adapt the unit to handle seed of corn but these dimensions and inclinations may vary slightly according to the seed to be handled.

The main object of this invention is to provide a groove forming and seed orienting runner unit which will be capable of forming a V-shaped bottom groove in the ground and discharging seed into the ground in a manner whereby the greatest dimension of the seed will extend longitudinally of the groove.

Another object of this invention is to provide a groove forming runner unit in accordance with the preceding object and constructed in a manner whereby it may be readily modified for attachment to numerous types of listers such as the International Harvester Company 80 Series, the John Deere 300 and 800 Models and the Dempster, Oliver and Allis-Chalmers listers.

A further object of this invention is to provide a runner unit in accordance with the preceding objects which will produce a generally V-shaped groove that will function to trap each seed discharged thereinto in the same position and hold the seed in position until the groove is closed by collapse of earth about the seed brought by compression caused by the runner unit, whereby uniform sprouting, growing, leafing out, shade pattern and ear and leaf placement (in the case of seed corn planted) is realized. Of course, uniform growth results in a greater majority of the crop being at full maturity at time of harvest and uniform ear and leaf placement enables closer planting, all of which result in more crop yield per acre.

A final object of this invention to be specifically enumerated herein is to provide an apparatus in accordance with the preceding objects which will conform to conventional forms of manufacture, be of simple construction and easy to install so as to provide a device that will be economically feasible, long lasting and relatively trouble-free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary perspective view of a conventional form of lister with a first form of the runner unit of the instant invention operatively mounted thereon;

FIG. 2 is a side elevational view of the assemblage illustrated in FIG. 1 as seen from the left side of FIG. 1;

FIG. 3 is a top plan view of the first form of runner unit;

FIG. 4 is a fragmentary longitudinal vertical sectional view taken substantially upon the plane indicated by the section line 4—4 of FIG. 3;

FIG. 5 is an enlarged transverse vertical sectional view taken substantially upon the plane indicated by the section line 5—5 of FIG. 3;

FIG. 6 is a schematic view of a groove formed by a runner unit with a lengthwise oriented seed corn disposed therein on edge and leaning to one side and without the sidewalls of the groove being collapsed to right and anchor the seed corn;

FIG. 7 is a schematic view similar to FIG. 6 but illustrating the manner in which the runner unit of the instant invention functions to collapse the sidewalls of the groove so as to right and anchor the seed corn in the groove;

FIG. 8 is a further schematic view illustrating the manner in which proper sprouting of seed corn is afforded by the runner unit of the instant invention; and FIGS. 9 and 10 are perspective views of two additional forms of runner units constructed in accordance with the present invention but modified only in the mounting portions thereof so as to be adapted for securement to different types of listers; and FIG. 11 is an enlarged fragmentary perspective view of the central area of the left side of the runner unit more clearly illustrating one of the forwardly and downwardly facing inclined cam surfaces of the runner unit.

Referring now more specifically to the drawings the numeral 10 generally designates a conventional form of corn lister such as any of those mentioned above and which is operable to intermittently drop seed, such as seed corn. A first form of seed orienter of the instant invention is generally referred to by the reference numeral 12 and is dependingly supported from the lister 10 in a manner to make a V-shaped groove in the ground 13 upon forward movement of the lister 10.

With attention now directed more specifically to FIGS. 3—5 of the drawings it may be seen that the seed orienter 12 includes an elongated hollow body referred to in general by the reference numeral 14 formed by longitudinally extending upstanding opposite sidewalls 16 and 18 having forwardly convergent upper forward marginal edge portions 16' and 18' joined together at 20 in any convenient manner such as by welding. In addition, the walls 16 and 18 are downwardly convergent and slightly outwardly convexed and secured together along their lower marginal edge portions as at 22. The body 14 includes front and rear ends and the sidewalls of the body 14 include front and rear end lower marginal edge portions. The front end lower marginal edge portions of the sidewalls 16 and 18 include rear end portions 24 which are generally horizontal and which terminate in forwardly and upwardly curving segments 26 inclined upwardly toward the juncture between the forward ends of the upper marginal edge portions 16' and 18'.

The reference numeral 28 designates the rear end lower marginal edge portions of the sidewalls 16 and 18 and the edge portions 28 may be seen to be generally horizontal but spaced above the rear end portions 24. Further, the edge portions 28 are generally parallel and spaced apart on opposite sides of the longitudinal centerline of the body 14 and the rear end upper marginal edge portions 16'' and 18'' of the sidewalls 16 and 18 extend rearwardly from the rear ends of the edge portions 16' and 18' and are generally parallel.

A partition wall 30 is secured between the sidewalls 16 and 18 in any convenient manner such as by welding at the rear and front ends of the marginal edges 24 and 28, respectively, and the partition wall 30 extends from the edges 24 upwardly to a point disposed between the junctures between the marginal edge portions 16', 16'' and 18', 18''. Also, a horizontal transverse plate 32 is secured between the marginal edge portions 16' and 18' immediately forwardly of the partition wall 30 and an upwardly directed apertured mounting tab is welded to the rear marginal edge portion of the transverse plate 32 and provides a means for mounting the orienter 12 from the lister 10 by means of removable fasteners 36.

The body 14 is approximately 14¼ inches long and approximately 4 inches in height at the partition wall 30. Additionally, the body 14 is approximately 2 7/8 inches wide at the top portion of its rear end and the length of the body 14 rearward of the partition wall 30 is approximately 5 inches. Also, the body is approximately 1 7/8 inches wide at its midportion.

From FIGS. 1, 3 and 5 of the drawings it may be seen that the base forward end portions of the rearward extensions of the sidewalls 16 and 18 are swaged outwardly as at 37 so as to define forwardly and downwardly facing as well as slightly outwardly offset cam surfaces or shoulders 38.

With attention now invited more specifically to FIG. 6 of the drawings there may be seen a simple V-groove 39 formed in the ground 41 including generally straight opposite sidewalls 43. A seed corn 45 has been lengthwise oriented in the bottom of the groove 39 and the seed corn 45 is disposed on one edge but slightly inclined so as to parallel the adjacent portion of one of the sidewalls 43.

As the forward end portion of the body 14 moves through the ground 41 a groove similar to groove 39 is formed in the ground and the seed corn 45 dropped from the lister 10 is dropped into the bottom of the groove immediately behind wall 30 and oriented as illustrated in FIG. 6 by the natural tendency of the seed to rest against one sidewall of the groove with the seed corn 45 horizontally disposed. However, as the seed corn 45 is being dropped into the groove 39 toward the position thereof illustrated in FIG. 6, the cam surfaces or shoulders 38 tend to enlarge the adjacent portions of the groove 39 in the areas 47 so as to collapse the lower portions of the sidewalls 43 whereby they fall downwardly and inwardly to positions 49 illustrated in FIG. 7 of the drawings. The downwardly and inwardly displaced portions of the sidewalls 43 tend to right the seed corn 45 on edge as illustrated in FIG. 7 of the drawings and to anchor the seed corn 45 securely within the bottom of the groove 39 until the associated lister 10 has closed the groove 39 in a conventional manner. Thus, not only do the cam surfaces or shoulders 38 serve to displace dirt from the sidewalls of the groove 39 down into the bottom of the groove so as to anchor the seed corn 45 within the groove, but the downward pressure on the sidewalls of the groove 39 by the cam surfaces 38 tends to inwardly displace the lower portions of the sidewalls 43 whereby the seed corn 45 is righted on edge. In this manner, as can be seen from FIG. 8, the root portion 51 of the sprouting seed corn 45 may readily grow in a downward direction and the sprout portion 52 may readily grow in an upward direction to penetrate the surface of the ground 41.

By way of comparison, conventional runner units which include transversely rounded lower ends or for other reasons, do not precisely orient the seed corn longitudinally of the associated groove with the seed corn standing on edge. Of course, if either side of the seed corn faces downwardly, either the root portion or the sprout portion will have to negotiate a 180° turn around the seed corn 45 in order to grow downwardly and upwardly, respectively. This can cause either the root system of a young sprout to be shallow and weak so as to die under temporary arid conditions or to be washed away under heavy rainy conditions. Further, if the sprout portion is forced to navigate a 180° turn about the seed corn 45, its bent configuration greatly reduces its strength to break ground crust and therefore a sprout portion forced to grow from the underside of seed corn may never break the ground. Of course, all of these adverse conditions tend to result in uneven growth, uneven leafing out, uneven ear placement and shade pattern as well as voids where no plants sprout at all. Thus, it may be readily appreciated that proper seed orientation results in advantages in germinating which have far reaching effects.

Referring now more specifically to FIGS. 7 and 8 of the drawings, there may be seen second and third forms of orienters generally referred to by the reference numerals 40 and 42, respectively. The orienter 40 includes an upstanding seed receiving tube 44 whose lower end is secured between the sidewalls 46 and 48 of the orienter 40 rearward of the partition wall (not shown) corresponding to the partition wall 30 in any convenient manner. Further, the orienter 40 includes a pair of forwardly and upwardly inclined strap sections 50 and 52 interconnected at their forward upper ends by means of an integral sharply curved bight portion 54. The rear lower ends of the strap sections 50 and 52 are secured to the transverse wall or panel 56 of the orienter 40 corresponding to the transverse panel 32 in any convenient manner such as by welding and a short rearwardly and upwardly inclined strap section 58 is secured and defines bracing extending between the forward marginal edge portion of the transverse panel 56 and the strap section 50.

The orienter 42 includes a transverse panel 60 corresponding to the transverse panels 32 and 56 and a seed receiving tube 62 corresponding to the tube 44. In addition, the seed orienter 42 includes an apertured mounting tab 64 corresponding to the tab 34.

While the sidewalls of the various orienters 12, 40 and 42 are generally straight, the rear ends of the rear lower marginal edge portions thereof are bent slightly inwardly so as to define a constant width throat such as throat 66 extending between the edges 28, see FIG. 3. In addition, when securing the forward lower marginal edge portions of the sidewalls of the various orienters 12, 40 and 42 together, the outer surfaces of the corresponding bodies are pointed as at 68, see FIG. 5, in order that the V-shaped trough or groove formed by the corresponding orienter will have a V-shaped bottom.

The orienters 40 and 42 include cam surfaces 70 and 72, respectively, similar to cam surfaces 38 and the forward end of the body 14 includes a horizontal projection 74 which is designed to fit into a slot (on a particular model lister) for the purpose of stabilizing the body 14. In addition, the orienter 42 includes a bow fixture 76 which serves the same purpose as well as a trash guard to keep trash from accumulating around the rear portion of the orienter 42.

Finally, the forward end portions of the sidewalls 16 and 17 are inclined rearwardly and outwardly approximately 5° relative to opposite sides of the vertical longitudinal center plane of the body 14 and upwardly and outwardly approximately 10° relative to the center plane of the body, whereby the body 14 will form a narrow V-shaped groove in the ground with sufficient depth and slightly compacted sidewalls.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What I claim as new is as follows:

1. A groove forming runner unit for attachment to a lister and adapted to form a groove for receiving seed and to orient the seed lengthwise and on edge at the same depth in said groove, said runner unit comprising an elongated body including front and rear ends and defined by longitudinally extending upstanding opposite sidewalls having forwardly convergent upper forward marginal edge portions whose ends join at the forward or bow end of said body, said sidewalls being downwardly convergent and including front and rear end lower marginal edge portions, said front lower marginal edge portions being secured together to close the lower portion of the forward end portion of said body and form a relatively sharp lower V-shaped apex, said front lower marginal edge portions also including generally horizontal rear end segments terminating forwardly in smoothly forwardly and upwardly curving segments inclined upwardly toward the juncture between the forward ends of the upper marginal edge portions of said sidewalls, said rear end lower marginal edge portions being generally horizontal, parallel, stepped upwardly from said rear end segments and swaged slightly transversely outwardly from forwardly adjacent portions of said sidewalls of said body at their forward ends forming inclined slightly outwardly displaced forwardly and downwardly facing cam surfaces for downwardly displacing the opposing sidewall portions of the groove formed by said unit and thereby breaking downwardly and inwardly the lower portions of the sidewalls of said groove so as to right on edge and anchor a seed disposed lengthwise in said groove, the zone defined between said forward ends of said rear marginal edge portions defining an upstanding passage extending vertically through said body for dropping seeds therethrough.

2. The combination of claim 1 including a transverse horizontal member secured between the rear end portions of the upper forward marginal edge portions of said sidewalls.

3. The combination of claim 1 including an upstanding transverse partition wall secured between said sidewalls generally coinciding with an upstanding plane containing the front ends of said rear end lower marginal edge portions.

4. The combination of claim 1 wherein the juncture between said front lower marginal edge portions defines a downwardly facing apex edge, said apex edge being reasonably sharply pointed at least in the area of said rear end segments of said front lower marginal edge portions.

5. The combination of claim 1 wherein said rear end lower marginal edge portions of said sidewalls are parallel and spaced apart on opposite sides of the longitudinal centerline of said body.

6. The combination of claim 1 wherein the forward end portions of said downwardly convergent sidewalls form an upwardly opening included angle of approximately 20°.

7. The combination of claim 1 wherein the forwardly convergent upper marginal edge portions of the forward end portions of said sidewalls form a rearwardly opening included angle of approximately 10°.